(12) United States Patent
Bräutigam et al.

(10) Patent No.: US 11,111,949 B2
(45) Date of Patent: Sep. 7, 2021

(54) SYSTEM MADE UP OF AN ATTACHMENT PART AND A RETAINING ELEMENT

(71) Applicant: ILLINOIS TOOL WORKS INC., Glenview, IL (US)

(72) Inventors: Martina Bräutigam, Weikersheim (DE); Matthias Wolf, Rothenburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 398 days.

(21) Appl. No.: 15/947,391

(22) Filed: Apr. 6, 2018

(65) Prior Publication Data

US 2018/0298936 A1 Oct. 18, 2018

(30) Foreign Application Priority Data

Apr. 13, 2017 (DE) ...................... 10 2017 108 000.7

(51) Int. Cl.
| | |
|---|---|
| *F16B 43/02* | (2006.01) |
| *F16B 35/00* | (2006.01) |
| *F16B 5/02* | (2006.01) |
| *B60Q 1/26* | (2006.01) |
| *B60Q 1/068* | (2006.01) |
| *B60Q 1/04* | (2006.01) |
| *F16B 37/04* | (2006.01) |
| *F16B 33/00* | (2006.01) |

(52) U.S. Cl.
CPC ............ *F16B 35/005* (2013.01); *B60Q 1/045* (2013.01); *B60Q 1/0433* (2013.01); *B60Q 1/0686* (2013.01); *B60Q 1/2626* (2013.01); *B60Q 1/2642* (2013.01); *F16B 5/0233* (2013.01); *F16B 33/004* (2013.01); *F16B 33/006* (2013.01); *F16B 37/043* (2013.01)

(58) Field of Classification Search
CPC ............................ F16B 35/005; B60Q 1/0433
USPC ......................................................... 411/546
See application file for complete search history.

(56) References Cited

U.S. PATENT DOCUMENTS

| | | | |
|---|---|---|---|
| 4,453,346 | A | 6/1984 | Powell |
| 4,671,536 | A | 6/1987 | Yoshimura |
| 5,238,286 | A | 8/1993 | Tanaka |
| 5,282,637 | A | 2/1994 | McCreadie |

(Continued)

FOREIGN PATENT DOCUMENTS

| | | |
|---|---|---|
| EP | 0840021 | 5/1998 |
| WO | WO 2016/126284 | 8/2016 |

*Primary Examiner* — Gary W Estremsky
(74) *Attorney, Agent, or Firm* — Thompson Hine LLP

(57) ABSTRACT

A system includes an attachment part and a holding element for holding the attachment part on a carrier part, the holding element having a threaded part connected to the attachment part and an internal thread for a holding screw, and a spacer part, the spacer part and the threaded part having interacting threads, the spacer part having a through opening flush with the internal thread of the threaded part when the spacer part is screwed to the threaded part, with the result that the carrier part can be held between a head of the holding screw and the spacer part, the threaded part having a holding section for holding the attachment part, the holding section having at least one latching element which interacts with at least one corresponding latching element of the attachment part for releasably latching the attachment part on the threaded part.

15 Claims, 2 Drawing Sheets

(56) References Cited

U.S. PATENT DOCUMENTS

| | | | | |
|---|---|---|---|---|
| 5,288,191 | A * | 2/1994 | Ruckert | F16B 5/0233 |
| | | | | 403/409.1 |
| 5,340,258 | A * | 8/1994 | Simon | F16B 35/005 |
| | | | | 411/339 |
| 5,492,388 | A * | 2/1996 | Kawasaki | B62D 25/147 |
| | | | | 296/193.02 |
| 5,881,979 | A * | 3/1999 | Rozier, Jr. | A47B 91/024 |
| | | | | 248/188.4 |
| 6,062,791 | A * | 5/2000 | Simon | F16B 5/0233 |
| | | | | 411/432 |
| 7,438,351 | B2 * | 10/2008 | Arroupe | B62D 25/147 |
| | | | | 296/193.02 |
| 7,488,135 | B2 * | 2/2009 | Hasegawa | F16B 5/0233 |
| | | | | 403/167 |
| 8,066,465 | B2 * | 11/2011 | Figge | F16B 5/025 |
| | | | | 411/34 |
| 8,122,612 | B2 * | 2/2012 | Knight, III | E04F 15/02183 |
| | | | | 33/836 |
| 8,764,337 | B2 * | 7/2014 | Binder | F16B 5/0283 |
| | | | | 403/343 |
| 8,827,585 | B2 * | 9/2014 | Figge | B62D 25/147 |
| | | | | 403/168 |
| 9,074,614 | B2 * | 7/2015 | Schwarzbich | F16B 5/00 |
| 9,302,716 | B2 * | 4/2016 | Sahi | F16B 5/0635 |
| 9,464,659 | B2 * | 10/2016 | Schwarzbich | F16B 39/24 |
| 9,829,020 | B2 * | 11/2017 | Ortega Dona | F16B 5/0283 |
| 9,829,021 | B2 * | 11/2017 | Johnson | F16B 5/0233 |
| 10,107,318 | B2 * | 10/2018 | Erpenbeck | F16B 5/025 |
| 2011/0243655 | A1 * | 10/2011 | Binder | F16B 5/0233 |
| | | | | 403/343 |

* cited by examiner

SYSTEM MADE UP OF AN ATTACHMENT PART AND A RETAINING ELEMENT

TECHNICAL FIELD

The invention relates to a system comprising an attachment part and a holding element for holding the attachment part on a carrier part, the holding element comprising a threaded part, which can be connected to the attachment part and has an internal thread for a holding screw, and a spacer part, the spacer part and the threaded part having interacting threads, with the result that the spacer part can be screwed to the threaded part, and the spacer part having a through opening for the holding screw, which through opening is flush with the internal thread of the threaded part in the state in which it is screwed to the threaded part, with the result that the carrier part can preferably be held between a head of the holding screw and the spacer part.

BACKGROUND

Attachment parts can be held, for example, on body parts of motor vehicles by way of holding elements of this type. The attachment parts can be, for example, attachment parts for the exterior region of the motor vehicle, such as housings for vehicle lights. The spacing between the attachment part and the carrier part, for example a vehicle body part, can vary on account of positional tolerances. In order to ensure a connection which is fixed at all times while avoiding an undesired development of noise, spacer parts can be provided which can be adapted with regard to their axial position and which, in the finally assembled state, bear against a side of the carrier part, which side faces the component.

EP 0 840 021 A1 has disclosed an apparatus for connecting components having a connecting screw and two spacer rings which surround the connecting screw, can be rotated with respect to one another, and of which one can be driven rotationally by way of the connecting screw. A planetary gear mechanism is provided for the rotational drive of the spacer ring. Said apparatus is considerably complex in structural terms. U.S. Pat. No. 5,492,388 A has likewise disclosed an apparatus for fastening an attachment part to a carrier part, a threaded bolt with an internal thread being welded to the carrier part. A threaded nut with an internal thread can be screwed onto an external thread of the threaded bolt and, as a result, can be arranged in different axial positions with respect to the threaded bolt. The threaded nut can be rotated by means of a tool which is provided for this purpose, with the result that said threaded nut bears against a face of an attachment part, which face faces said threaded nut. The setting of the threaded nut is complex, however, as a result of the necessity of a tool which is provided for this purpose, and the threaded nut has to be accessible from outside for the tool for the adaptation to any positional tolerances. In the case of the two abovementioned solutions of the prior art, complete dismantling of the apparatus which is provided for holding the attachment part on the carrier part is not possible or is possible only with considerable effort.

WO 2016/126284 A1 has disclosed a spacer nut for connecting fastening sections of two components, which fastening sections are spaced apart from one another, a threaded part with an internal thread for a screw and an intermediate piece which configures a thread and a through opening being provided, it being possible for the threaded part and the intermediate piece to be connected to one another in one piece, and said threaded part and intermediate piece configuring a receiving space for the fastening section of a first one of the components between them. The internal thread of the threaded part and the through opening or the internal thread of the intermediate piece are flush with one another. Furthermore, a spacer piece is provided with an external thread which can be screwed into the internal thread of the intermediate piece, and which has a through opening which is flush with the internal thread of the threaded part and a contact face which integrates the one end of the through opening and is provided for bearing against the fastening sections of the second one of the components. By way of said apparatus, an adaptation, which is simple in structural terms and assembly technology terms, of the spacer piece to positional tolerances between the components is possible. Dismantling of the entire apparatus from the components is also possible. There is in part the desire, however, to make simple and captive pre-mounting of a holding element on the attachment part possible, for holding an attachment part on a carrier part.

SUMMARY

Proceeding from the described prior art, the invention is based on the object of providing a system of the type mentioned at the outset, which system provides, in a simple way, an adaptation to positional tolerances between the components and captive pre-mounting of the holding element on the attachment part.

For a system of the type mentioned at the outset, the invention achieves the object by virtue of the fact that the threaded part has a holding section for holding the attachment part, the holding section having at least one latching element which interacts with at least one corresponding latching element of the attachment part for releasably latching the attachment part on the threaded part.

The carrier part and the attachment part can be, for example, a carrier part and an attachment part of a vehicle, such as a passenger car or truck. The carrier part can be, for example, a body part of the vehicle. The attachment part can be, for example, an attachment part for the exterior region of the vehicle. For example, the attachment part can be a housing part, for example for an exterior light of the vehicle. The spacer part can consist of plastic. It can be produced, for example, using an injection molding process. The threaded part can also consist of plastic. It can likewise be produced, for example, using an injection molding process. The spacer part can have a basic shape which is, for example, hollow-cylindrical.

The threaded part of the holding element has an internal thread, into which a holding screw can be screwed. Moreover, the holding element has a spacer part with a thread which interacts with a corresponding thread of the threaded part, with the result that the spacer part can be screwed to the threaded part. The spacer part has a through opening which is flush with the internal thread of the threaded part in the case of the spacer part being screwed to the threaded part. As a consequence, the holding screw can be screwed through the through opening of spacer part into the internal thread of the threaded part. Before the holding screw is screwed in, a carrier part with a through opening can be placed onto the spacer part in such a way that the through opening of the carrier part is flush with the through opening of the spacer part. Subsequently, the holding screw can be screwed through the through opening of the carrier part and the through opening of the spacer part into the internal thread of the threaded part. In this way, the carrier part can be held in a clamping manner, for example, between a head of the holding screw and the spacer part. The holding screw can be screwed in, for example, from the inner side of the vehicle body part if the attachment part is an exterior part of the vehicle. The attachment part is held on the threaded part of the holding element, with the result that the attachment part is held on the carrier part in this way.

The axial relative position between the spacer part and the threaded part can be adapted by way of the spacer part being screwed to the threaded part. In this context, axial means in the direction of the longitudinal axis of the interacting threads of the spacer part and the threaded part. The spacer part can thus be moved axially closer to the threaded part by way of the spacer part being screwed onto the threaded part. The spacer part can be moved axially away from the threaded part by way of the spacer part being unscrewed from the threaded part. As a result, a tolerance compensation operation can take place in relation to the position of the carrier part. The spacer part can thus be unscrewed from the threaded part until it bears against a side of the carrier part, which side faces said spacer part. The spacer part has a corresponding contact face for bearing against the carrier part. In this way, in the finally assembled state, a connection which is fixed at all times is achieved between the carrier part and the attachment part, and undesired noise, for example rattling noise, is avoided.

According to the invention, the threaded part has a holding section for holding the attachment part. The holding section has at least one latching element. The attachment part has at least one corresponding latching element. In the case of an attachment part which is inserted into the holding section of the threaded part, the latching elements of the threaded part and the attachment part latch to one another, with the result that the threaded part and therefore the holding element are held releasably on the attachment part. Even multiple dismantling and re-assembling is possible as a result of said releasable connection between the attachment part and the holding element. At the same time, the holding element with the threaded part can be pre-assembled on the attachment part, the releasable latching action forming a captive securing means, with the result that the attachment part and the holding element also cannot be detached during transport from a supplier to a customer. In the assembled state, moreover, the latching connection provides an anti-theft device which at least makes dismantling of the attachment part from the outside considerably more difficult, or makes it possible only by way of destruction of the latching connection.

The spacer part can comprise a threaded section which configures the thread which interacts with the threaded part, and a head section which configures a contact face with the carrier part. The head section can have enlarged cross-sectional dimensions in comparison with the threaded section. An enlarged contact face with the carrier part is achieved as a result. Furthermore, an end stop can be provided for screwing the spacer part into the threaded part. This can improve the manageability. The system according to the invention can also comprise the holding screw.

In accordance with one refinement, the threaded part has an external thread, and the spacer part has an internal thread, by way of which it can be screwed onto the external thread of the threaded part. The spacer part can thus be screwed onto the threaded part and adjusted on the latter in a particularly simple way.

According to a further refinement, the internal thread of the threaded part and the interacting threads of the spacer part and the threaded part can overlap at least in sections in the axial direction. This results in a particularly compact construction, since the interacting threads of the spacer part and the threaded part firstly and the internal thread of the threaded part secondly are not arranged behind one another in the axial direction, but rather overlap at least in sections, optionally also completely. The threaded part can have, for example, a hollow-cylindrical threaded section which extends from the holding section, the inner face of which forms the internal thread of the threaded part for screwing in the holding screw, and the outer face of which forms the external thread for screwing on the spacer part.

The holding section of the threaded part can form a holding receptacle, into which the attachment part can be pushed. The attachment part can have a recess, into which in turn the threaded part is pushed with its holding section. This results in simple assembly by way of a purely translational relative movement and, at the same time, a secured connection between the attachment part and the threaded part. The recess of the attachment part can be, for example, a receiving groove which is formed by way of a C-shaped wall section. The threaded part can then have longitudinal grooves on two opposite outer sides, which longitudinal grooves are pushed onto the ends of the C-shaped wall section.

It can be provided in accordance with a further refinement that the at least one latching element of the attachment part is at least one latching recess, and that the at least one latching element of the holding section is at least one elastic latching arm which engages into the at least one latching recess. The elastic latching arm can have a latching hook, for example, at its free end. When the attachment part is inserted into the holding section of the threaded part, the latching arm is first of all deformed elastically out of its rest shape. When the latching recess is reached, the latching hook of the latching arm engages in a latching manner into the latching recess and engages behind the latter with a recovery of the latching arm in the direction of its rest shape. The latching hook which engages into the latching recess offers a considerable resistance against a release, which further improves the captive securing means and/or anti-theft device.

In accordance with a further refinement, the through opening of the spacer part can have at least one clamping section, with the result that a holding screw which is to be screwed into the internal thread drives the spacer part in a clamping manner. The clamping section can form, for example, a cross section which is narrowed in comparison with the remaining cross section of the through opening. The narrowed cross section is configured in such a way that, on account of its diameter, a holding screw which is to be screwed into the internal thread of the threaded part bears against the clamping section in a clamping manner. A frictionally locking connection is produced as a result. Clamping driving takes place in the case of a rotation of the holding screw, as takes place for screwing into the internal thread of the threaded part. The spacer part therefore corotates with the holding screw. As a result, screwing of the spacer part on or in the interacting thread of the threaded part takes place while the holding screw is being screwed into the threaded part.

Here, the internal thread of the threaded part firstly and the interacting threads of the threaded part and the spacer part secondly can be configured in such a way that, in the case of a rotation of the holding screw for screwing into the internal thread of the threaded part, the spacer part is unscrewed from the threaded part. A suitable configuration of the threads can achieve a situation, for example, where, in the case of a rotation of the holding screw for screwing into the threaded part and the driving of the spacer part which takes place in the process, said spacer part is unscrewed from the threaded part, and the spacer piece and the threaded part are therefore moved axially away from one another. The thread of the spacer part and that thread of the threaded part which interacts with it can be, for example, left-handed threads. The internal thread of the threaded part can be, for example, a right-handed thread. It goes without saying, however, that a reversed configuration is also conceivable.

It can be provided in accordance with a further refinement in this regard that the clamping section is configured in such a way that a holding screw which is to be screwed into the internal thread of the threaded part drives the spacer part in a clamping manner up to a limit torque, and, when the limit torque is exceeded, the holding screw is rotated relative to the spacer part while being screwed into the internal thread of the threaded part. The frictionally locking connection between the clamping section and the holding screw is sufficient up to the limit torque, with the result that the holding screw does not spin in the clamping section, and therefore also rotates the spacer part via the clamping section during its rotation. If the limit torque is exceeded, in contrast, the frictionally locking connection is overcome. The holding screw slips in the clamping section, with the result that the holding screw rotates in the through opening with the clamping section, without the spacer part also being rotated further. The limit torque is selected by way of the selection of the materials and the cross-sectional narrowing which is caused by way of the clamping section, in such a way that said limit torque is not overcome until the spacer part bears against a side of the carrier part, which side faces said spacer part. As a result, the spacer part is automatically unscrewed from the threaded part during screwing in of the holding screw, until the spacer part comes into contact with that side of the carrier part which faces it. In this way, it is ensured in a particularly simple way and with consideration of positional tolerances that the spacer part bears against the carrier part in the finally assembled state. Automatic tolerance compensation takes place. Undesired noise, for example rattling noise, is avoided reliably.

In order to screw out the spacer part for adaptation to any possible positional tolerances, it is possible but not necessary that the holding screw which is provided for screwing into the threaded part already engages at this time into the internal thread of the threaded part and is screwed into it. It is also possible, in particular, that said engaging or screwing in takes place only when the limit torque is exceeded.

The abovementioned refinements make an adaptation of the spacer part possible, without it being necessary for the spacer part to be accessible from the outside for this purpose, for example for a tool in this regard. A separate tool for the adaptation of the spacer part is not required. First of all, the carrier part and the attachment part can be positioned in the provided position with respect to one another, and subsequently the spacer part can be set to the respective actually prevailing spacing between the attachment part and the carrier part.

The clamping section can be configured from a different material than a main body of the spacer part. In particular, the clamping section can be configured from a softer material than a main body of the spacer part. By way of example, the clamping section can be formed from an elastomer, in particular a thermoplastic elastomer (TPE). A material of this type provides a satisfactory frictionally locking connection and a sufficient elasticity, with the result that no damage of the clamping section occurs even in the case of multiple assembly and dismantling. The clamping section can be molded onto the main body of the spacer part, for example, using a two-component injection molding process. Furthermore, a hollow-cylindrical insert can be provided which is inserted into the main body of the spacer part and forms the through opening with the clamping section. Accordingly, the insert can be formed completely from the material which is provided for the clamping section.

In accordance with a further refinement, sealing means can be provided for sealing the spacer part with respect to the attachment part. As a result, a passage of, for example, liquid, such as water, can be prevented.

Here, the sealing means can be formed by way of an insert which forms the clamping section and is inserted into the spacer part, for example into a head section of the spacer part, in particular a hollow-cylindrical insert with a through opening which is flush with the internal thread of the threaded part. At least one clamping section can be configured in said through opening. The head section can form a contact face which bears against the attachment part in the mounted state. The insert can project slightly beyond the contact face, with the result that it bears sealingly against the attachment part in the mounted state. The insert can consist of a thermoplastic elastomer. This provides a particularly satisfactory sealing action.

In accordance with a further refinement, a stop can be provided between the spacer part and the threaded part, which stop counteracts unscrewing (in particular, completely) of the spacer part from the threaded part when an end position is reached. A stop of this type forms a thread lock which prevents (complete) unscrewing of the spacer part from the threaded part beyond the end position or at least requires an increased handling force (in comparison with a normal handling force). The end position can be reached shortly before complete unscrewing of the spacer part or already at an earlier point. The stop can comprise a rigid stop arm which is configured on the threaded part, and a stop face which is configured on the spacer part. The stop face which is configured on the spacer part can be formed, for example, by way of a radial elevation of the spacer part. In an end position, the radial elevation of the rotatable spacer part then comes into contact with the rigid stop arm.

Furthermore, the holding element, in particular the threaded part of the holding element, can be connected non-releasably to the attachment part. Furthermore, the holding element, in particular the threaded part of the holding element, can be connected to the attachment part by way of screwing, adhesive bonding and/or welding. For example, friction welded connections or ultrasonic welded connections are possible as welded connections. A preferably non-releasable connection of this type is produced, in particular, after the latching of the holding section on the attachment part. The latching connection can then secure the pre-assembly position, in particular. The further, preferably non-releasable connection secures the holding element on the attachment part in an even more improved manner.

BRIEF DESCRIPTION OF THE DRAWINGS

One exemplary embodiment of the invention will be described in greater detail in the following text using figures, in which, diagrammatically.

Unless otherwise specified, identical designations denote identical objects in the figures.

DETAILED DESCRIPTION

Figure 1:
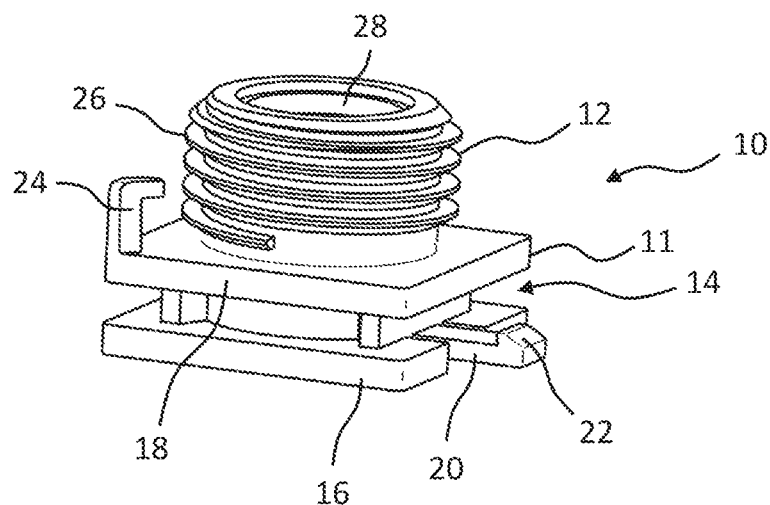
FIG. 1 shows a threaded part of a holding element of a system according to the invention in a perspective view.

The threaded part 10 which is shown in FIG. 1 has a holding section 11 and a threaded section 12 which extends from the latter. The holding section 11 forms a holding receptacle 14 for an attachment part. In the example which is shown, the holding receptacle 14 is configured between a first base plate 16 and a second base plate 18 which is arranged spaced apart from said first base plate 16 in parallel. Moreover, the holding section 11 has an elastic latching arm 20, at the free end of which a latching hook 22 is configured. Moreover, an angled-away rigid stop arm 24 is situated on the upper base plate 18. The outer face of the hollow-cylindrical threaded section 12 forms an external thread 26. The inner face of the threaded section 12 forms an internal thread 28.

Moreover, the holding element of the system according to the invention comprises a spacer part 30 which has a hollow-cylindrical basic shape. The spacer part 30 comprises a hollow-cylindrical threaded section 32 and a head section 34 which is configured on the latter with an enlarged cross section in comparison with the threaded section 32. The head section 34 forms a contact face 36. The inner face of the threaded section 32 forms an internal thread 38 which interacts with the external thread 26 of the threaded part. A hollow-cylindrical insert 40 is inserted into the head section 34, which hollow-cylindrical insert 40 forms a through opening which is flush with the internal thread 28 of the threaded part. In the example which is shown, a plurality of, in particular three, clamping sections 42 are configured in the through opening, which clamping sections 42 form a narrowed cross section in comparison with the through opening. The insert 40 consists of a softer material than the remaining main body of the spacer part 30. For example, the insert 40 can consist of a thermoplastic elastomer (TPE). The main body can consist of a harder plastic. In a state in which it is mounted on an attachment part, the insert 40 can bear sealingly against an attachment part. To this end, the insert 40 can project slightly beyond the contact face 36. The spacer part 30 can be produced using a two-component injection molding process. The threaded part 10 can also consist of plastic and be produced using a plastic injection molding process.

By way of the spacer part 30 being screwed onto or unscrewed from the threaded part 10, the axial spacing between the spacer part 30 and the threaded part 10 can be changed. In the example which is shown, the external thread 26 of the threaded part 10 and the internal thread 38 of the spacer part 30, which internal thread 38 interacts with said external thread 26, are left-handed threads. The internal thread 28 of the threaded part 10 is a right-handed thread and serves for screwing in of a holding screw which is plugged through the through opening of the spacer part 30, as will be described in yet greater detail in the following text.

Figure 2:
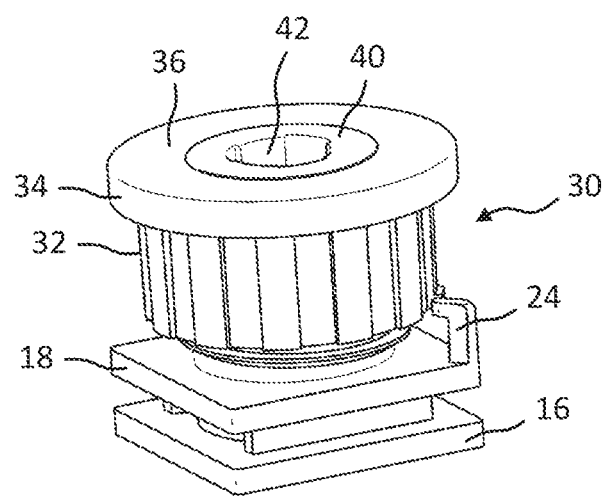
FIG. 2 shows the threaded part from FIG. 1 with a spacer part of the holding element, which spacer part is screwed to said threaded part, in a perspective view.
Figure 3:
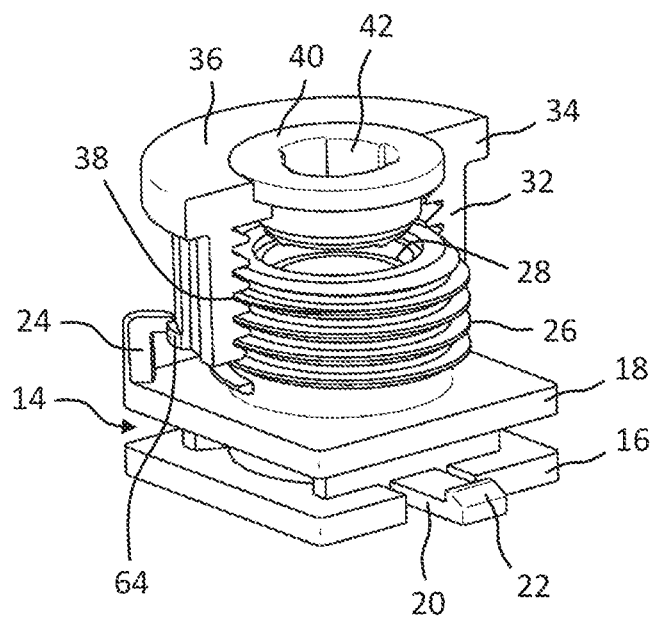
FIG. 3 shows a partially sectioned perspective illustration of the threaded part and spacer part shown in FIG. 2.
Figure 4:
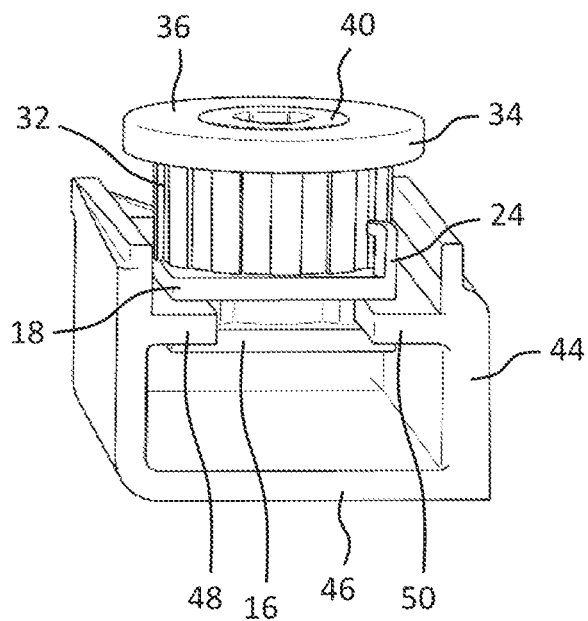
FIG. 4 shows the threaded part and spacer part shown in FIG. 2 in the state in which they are held on an attachment part, in a perspective view.
Figure 5:
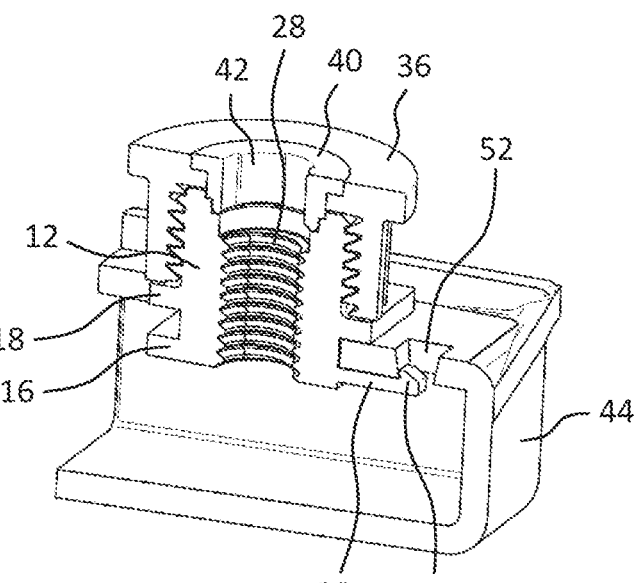
FIG. 5 shows a partially sectioned perspective view of the threaded part, spacer part and attachment part shown in FIG. 4.

FIGS. 4 and 5 show the holding element, which is formed from the threaded part 10 and the spacer part 30 shown in FIGS. 2 and 3, in a state in which said holding element is pre-assembled on an attachment part 44. In the example which is shown, the attachment part 44 which can be, for example, an exterior part of a vehicle, such as of a passenger car or truck, for example a housing for an exterior light of the vehicle, has a C-shaped wall section 46 which can be pushed into the holding receptacle 14 of the threaded part 10 for assembly purposes. Here, the two ends 48, 50 of the C-shaped wall section 46 engage on opposite sides into the holding receptacle 14 which is formed between the base plates 16 and 18 of the threaded part 10, as can be seen in FIG. 4, in particular. A latching recess 52 is configured at that closed end of the wall section 46 which is concealed in FIG. 4, the latching hook 22 of the elastic latching arm 20 of the threaded part 10 engaging behind said latching recess 52 in a latching manner in the state in which it is completely pushed in, as can be seen in FIG. 5, in particular. While the attachment part 44 is being pushed into the holding receptacle 14, the elastic latching arm 20 is first of all deflected elastically out of its rest shape, until the latching hook 22 engages into the latching recess 52 of the attachment part 44. In the pre-assembled state, said latching connection forms a captive securing means, with the result that the holding element cannot be detached in an undesired manner from the attachment part 44, for example during transport. In the finally assembled state, said latching connection forms an anti-theft device against detaching of the attachment part 44 from the holding element and therefore from a carrier part which is connected to the latter. Dismantling is possible at the same time, by the latching hook 22 being pressed out of the latching recess 52 with elastic deflection of the latching arm 20, for example by means of a suitable tool.

Figure 6:
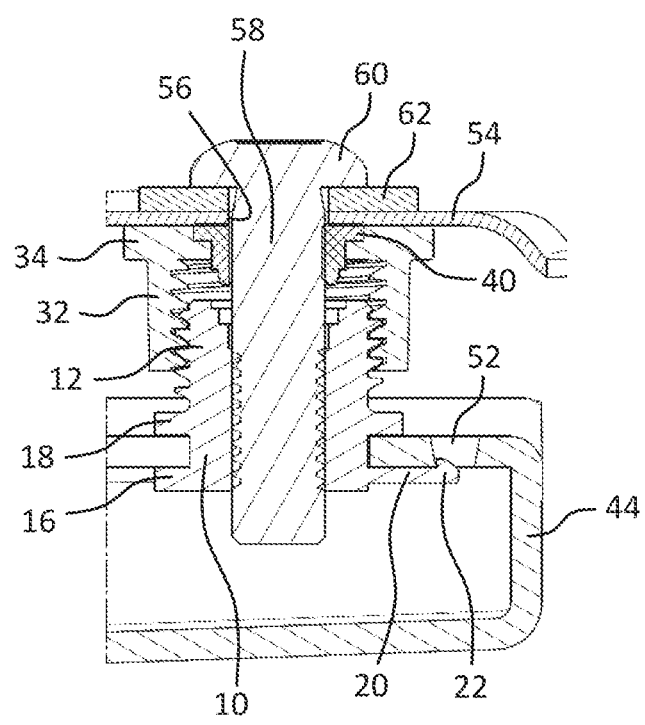
FIG. 6 shows a sectional view of the threaded part, spacer part and attachment part shown in FIG. 4 in the state in which they are fastened to a carrier part.

In order to hold the attachment part 44 with the holding element on a carrier part 54 which is shown in FIG. 6 and can be, for example, a body part 54 of a vehicle, the carrier part 54 is first of all placed onto the spacer part 30 with a through opening 56 flush with respect to the through opening of the spacer part 30. Subsequently, a holding screw 58 is inserted through the through opening 56 of the carrier part 54 into the through opening of the spacer part 30. A washer 62 can be arranged between the screw head 60 and the carrier part 54. Here, the narrowed cross section which is brought about by way of the clamping sections 42 is configured in such a way that there is a frictionally locking connection between the external diameter of the holding screw 58 and the clamping sections 42. Said frictionally locking connection is such that, in the case of rotating of the holding screw 58 for screwing into the internal thread 28 of the threaded part 10, the holding screw 58 first of all drives the spacer part 30 via the clamping sections 42 in a rotational manner. Here, unscrewing of the spacer part 30 from the threaded part 10 occurs on account of the configuration of the interacting threads of the spacer part 30 and the threaded part 10 as left-handed threads and the configuration of the internal thread 28 of the threaded part 10 as a right-handed thread. This takes place until the spacer part 30 comes into contact by way of its contact face 36 with that side of the carrier part 54 which faces it. As a result, a limit torque is exceeded, and the frictionally locking connection between the holding screw 58 and the clamping sections 42 is canceled, with the result that the holding screw 58 subsequently slips in the clamping sections 42, and the holding screw 58 is screwed (further) into the internal thread 28 of the threaded part without further corotating of the spacer part 30 occurring.

In the state which is shown in FIG. 6, the attachment part 44 is therefore held on the carrier part 54 in a stable manner, undesired noise, such as rattling noise, being avoided reliably as a result of the automatic tolerance compensation by way of the spacer part 30. The assembly and dismantling of the system according to the invention are simple, and the system has a simple and compact overall design.

Moreover, a radial elevation 64 is configured on the outer side of the threaded section 32 of the spacer part 30, which radial elevation 64 forms a stop face (see FIG. 3). Contact of the elevation 64 with the stop arm 24 marks an end position. Unscrewing of the spacer part 30 from the threaded part 10 beyond the end position is prevented by way of said stop.

It is to be clearly understood that the above description is intended by way of illustration and example only, is not intended to be taken by way of limitation, and that other changes and modifications are possible.

| List of Designations | |
|---|---|
| 10 | Threaded part |
| 11 | Holding section |
| 12 | Threaded section |
| 14 | Holding receptacle |
| 16 | First base plate |
| 18 | Second base plate |
| 20 | Latching arm |
| 22 | Latching hook |
| 24 | Stop arm |
| 26 | External thread |
| 28 | Internal thread |
| 30 | Spacer part |
| 32 | Threaded section |
| 34 | Head section |
| 36 | Contact face |
| 38 | Internal thread |
| 40 | Insert |
| 42 | Clamping section |
| 44 | Attachment part |
| 46 | Wall section |
| 48, 50 | Ends of the C-shaped wall section |
| 52 | Latching recess |
| 54 | Carrier part |
| 56 | Through opening |
| 58 | Holding screw |
| 60 | Screw head |
| 62 | Washer |
| 64 | Radial elevation |

The invention claimed is:

1. A system comprising an attachment part (44) and a holding element for holding the attachment part (44) on a carrier part (54), the holding element comprising a threaded part (10), which is releasably connected to the attachment part (44) and has an internal thread (28) for a holding screw (58), and a spacer part (30), the spacer part (30) and the threaded part (10) having interacting threads (26, 38), with the result that the spacer part (30) can be screwed to the threaded part (10), and the spacer part (30) having a through opening (56) for the holding screw (58), which through opening (56) is flush with the internal thread (28) of the threaded part (10) in the state in which it is screwed to the threaded part (10), with the result that the carrier part (54) can be held between a head (62) of the holding screw (58) and the spacer part (30), wherein the threaded part (10) has a holding section (11) for holding the attachment part (44), the holding section (11) engaged in an opening of the attachment part and having at least one latching element which interacts with at least one corresponding latching element of the attachment part (44) for releasably latching the attachment part (44) on the threaded part (10), wherein the at least one latching element of the attachment part (44) is at least one latching recess (52) that is spaced from the opening of the attachment part, and wherein the at least one latching element of the holding section (11) is at least one elastic latching arm (20) which engages into the at least one latching recess (52), wherein a stop is provided between the spacer part (30) and the threaded part (10), wherein the stop counteracts the spacer part (30) from being unscrewed from the threaded part (10) when an end position is reached, wherein the stop comprises a rigid stop arm (24) which is configured on the threaded part (10), and a stop face which is configured on the spacer part (30).

2. The system as claimed in claim 1, wherein the threaded part (10) has an external thread (26), and wherein the spacer part (30) has an internal thread (38).

3. The system as claimed in claim 1, wherein the internal thread (28) of the threaded part and the interacting threads (26, 38) of the spacer part (30) and the threaded part (10) overlap at least in sections in the axial direction.

4. The system as claimed in 1, wherein the holding section (11) of the threaded part (10) forms a holding receptacle (14), into which the attachment part (44) can be pushed.

5. The system as claimed in claim 1, wherein the elastic latching arm (20) includes a latching hook (22) engaged axially into the latching recess (52).

6. The system as claimed in claim 1, wherein the through opening of the spacer part (30) has at least one clamping section (42), with the result that a holding screw (58) which is to be screwed into the internal thread (28) of the threaded part (10) drives the spacer part (30) in a clamping manner.

7. The system as claimed in claim 6, wherein the internal thread (28) of the threaded part (10) firstly and the interacting threads (26, 38) of the threaded part (10) and the spacer part (30) secondly are configured in such a way that, in the case of a rotation of the holding screw (58) for screwing into the internal thread (28) of the threaded part (10), the spacer part (30) is unscrewed from the threaded part (10).

8. The system as claimed in claim 7, wherein the clamping section (42) is configured in such a way that a holding screw (58) which is to be screwed into the internal thread (28) of the threaded part (10) drives the spacer part (30) in a clamping manner up to a limit torque, and, when the limit torque is exceeded, the holding screw (58) is rotated relative to the spacer part (30) while being screwed into the internal thread (28) of the threaded part (10).

9. The system as claimed in claim 8, wherein at least the clamping section (42) is configured from a different material than a main body of the spacer part (30).

10. The system as claimed in claim 1, wherein the opening in the attachment part is a receiving groove formed by a C-shaped wall section.

11. The system as claimed in claim 6, wherein an insert (40) forms the clamping section (42) and is inserted into the spacer part (30).

12. The system as claimed in claim 11, wherein the insert (40) consists of a thermoplastic elastomer that projects slightly beyond a contact face of the spacer part.

13. A system comprising:
an attachment part (44) and a holding element, the holding element holding the attachment part (44) on a carrier part (54), the holding element comprising a threaded part (10) releasably connected to the attachment part (44) and having an internal thread (28) receiving a holding screw (58), and a spacer part (30), the spacer part (30) and the threaded part (10) having interacting threads (26, 38) such that the spacer part (30) is screwed to the threaded part (10), and the spacer part (30) having a through opening (56) receiving the holding screw (58), which through opening (56) is flush with the internal thread (28) of the threaded part (10) when the spacer part is fully screwed onto the threaded part (10), wherein the carrier part (54) is held between a head (62) of the holding screw (58) and the spacer part (30), wherein the threaded part (10) has a holding section (11) for holding the attachment part (44), the holding section (11) having at least one latching element which interacts with at least one corresponding latching element of the attachment part (44) for releasably latching the attachment part (44) on the threaded part (10), wherein the through opening of the spacer part (30) has a plurality of clamping sections (42) such that the holding screw (58) drives the spacer part (30) in a clamping manner, wherein the each clamping section (42) is formed by a respective radially inwardly extending and axially running portion of a wall of the through opening of the spacer part (30), wherein the holding section (11) is engaged in an opening of the attachment part, wherein the opening in the attachment part is a receiving groove formed by a C-shaped wall section.

14. The system as claimed in claim 13 wherein the internal thread (28) of the threaded part (10) firstly and the interacting threads (26, 38) of the threaded part (10) and the spacer part (30) secondly are configured in such a way that rotation of the holding screw (58) for screwing into the internal thread (28) of the threaded part (10) causes the spacer part (30) to unscrew from the threaded part (10).

15. A system comprising:
an attachment part (44) and a holding element, the holding element holding the attachment part (44) on a carrier part (54), the holding element comprising a threaded part (10) releasably connected to the attachment part (44) and having an internal thread (28) receiving a holding screw (58), and a spacer part (30), the spacer part (30) and the threaded part (10) having interacting threads (26, 38) such that the spacer part (30) is screwed to the threaded part (10), and the spacer part (30) having a through opening (56) receiving the holding screw (58), which through opening (56) is flush with the internal thread (28) of the threaded part (10) when the spacer part is fully screwed onto the threaded part (10), wherein the carrier part (54) is held between a head (62) of the holding screw (58) and the spacer part (30), wherein the threaded part (10) has a holding section (11) for holding the attachment part (44), the holding section (11) having at least one latching element which interacts with at least one corresponding latching element of the attachment part (44) for releasably latching the attachment part (44) on the threaded part (10), wherein the internal thread (28) of the threaded part (10) and the interacting threads (26, 38) of the threaded part (10) and the spacer part (30) are configured in such a way that rotation of the holding screw (58) for screwing into the internal thread (28) of the threaded part (10) causes the spacer part (30) to unscrew from the threaded part (10), wherein a stop is provided between the spacer part (30) and the threaded part (10), which stop counteracts the spacer part (30) from being unscrewed from the threaded part (10) when an end position is reached, wherein the threaded part (10) includes a plate (18), wherein the stop comprises a rigid stop arm (24) extending from the plate (18) and a stop face located on the spacer part (30) for contacting the rigid stop arm at the end position.

\* \* \* \* \*